US012124201B2

(12) United States Patent
Hara et al.

(10) Patent No.: US 12,124,201 B2
(45) Date of Patent: Oct. 22, 2024

(54) IMAGE FORMING APPARATUS, ABNORMALITY DIAGNOSIS METHOD, AND IMAGE FORMING SYSTEM

(71) Applicant: CANON KABUSHIKI KAISHA, Tokyo (JP)

(72) Inventors: Seiji Hara, Shizuoka (JP); Yohei Suzuki, Shizuoka (JP); Masafumi Monde, Kanagawa (JP); Hiroshi Hagiwara, Shizuoka (JP); Yoshitaka Zaitsu, Chiba (JP); Hiromitsu Kumada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/746,805

(22) Filed: May 17, 2022

(65) Prior Publication Data

US 2022/0276600 A1 Sep. 1, 2022

Related U.S. Application Data

(63) Continuation of application No. 17/221,638, filed on Apr. 2, 2021, now Pat. No. 11,360,420.

(30) Foreign Application Priority Data

Apr. 7, 2020 (JP) ................................ 2020-069277

(51) Int. Cl.
*G03G 15/00* (2006.01)

(52) U.S. Cl.
CPC ......... *G03G 15/55* (2013.01); *G03G 15/5008* (2013.01); *G03G 15/5016* (2013.01)

(58) Field of Classification Search
CPC . G03G 15/5016; G03G 15/5008; G03G 15/55
See application file for complete search history.

(56) References Cited

U.S. PATENT DOCUMENTS 11,360,420 B2 6/2022 Hara
2007/0070456 A1 * 3/2007 Nishimura ......... H04N 1/00037 358/504

(Continued)

FOREIGN PATENT DOCUMENTS

CN 1700116 A 11/2005
CN 101154067 A 4/2008

(Continued)

*Primary Examiner* — Stephanie E Bloss
*Assistant Examiner* — Michael A Harrison
(74) *Attorney, Agent, or Firm* — Canon U.S.A., Inc. IP Division

(57) ABSTRACT

An image forming apparatus includes an image forming unit having a plurality of members, a control unit, and a sound collecting unit. The control unit controls operations of the plurality of members in a first operation mode in which the image forming unit forms an image on a recording material. The sound collecting unit collects a sound that arises in the image forming apparatus during the first operation mode execution to generate a sound signal. When it is determined, based on the generated sound signal, that an abnormal sound has arisen, the control unit determines a source of the abnormal sound by transitioning to a second operation mode after the first operation mode has ended and causing, in the second operation mode, one or more members, from the plurality of members, that are possible sources of the abnormal sound to operate separately from the remaining plurality of members.

12 Claims, 11 Drawing Sheets

(56) References Cited

U.S. PATENT DOCUMENTS

| | | | | |
|---|---|---|---|---|
| 2009/0097870 | A1 * | 4/2009 | Misumi | G03G 15/5079 399/36 |
| 2020/0209795 | A1 * | 7/2020 | Okumura | G03G 15/50 |

FOREIGN PATENT DOCUMENTS

| | | | |
|---|---|---|---|
| CN | 101414151 | A | 4/2009 |
| JP | 2003083801 | A | 3/2003 |
| JP | 2006208074 | A | 8/2006 |
| JP | 2019116007 | A | 7/2019 |
| JP | 2019197153 | A | 11/2019 |
| JP | 2020194290 | A | 12/2020 |
| JP | 2021166353 | A | 10/2021 |

* cited by examiner

IMAGE FORMING APPARATUS, ABNORMALITY DIAGNOSIS METHOD, AND IMAGE FORMING SYSTEM

CROSS-REFERENCE TO RELATED APPLICATIONS

The present application is a continuation of U.S. patent application Ser. No. 17/221,638, filed on Apr. 2, 2021, which claims priority from Japanese Patent Application No. 2020-069277 filed Apr. 7, 2020, which are hereby incorporated by reference herein in their entireties.

BACKGROUND

Field

The present disclosure relates to an image forming apparatus, an abnormality diagnosis method, and an image forming system.

Description of the Related Art

In image forming apparatuses such as copiers and printers, continuing to use a member which has reached its expected lifetime can result in abnormal sounds arising from the member. Japanese Patent No. 4863802 discloses a method for identifying a member which is a source of an abnormal sound by analyzing acoustic pressure levels in each of frequency components of sounds collected in an image forming apparatus.

However, with the frequency analysis method disclosed by Japanese Patent No. 4863802, if a plurality of members are producing sounds simultaneously in overlapping bands, those sounds cannot be correctly separated, which makes it difficult to accurately identify the source of an abnormal sound.

SUMMARY

What is needed is a system that makes it possible to more accurately identify the source of an abnormal sound in an image forming apparatus when the abnormal sound arises.

According to an aspect of the present disclosure, an image forming apparatus includes an image forming unit that includes a plurality of members, a control unit configured to control operations of the plurality of members in a first operation mode in which the image forming unit forms an image on a recording material, and a sound collecting unit configured to collect a sound that arises in the image forming apparatus during execution of the first operation mode to generate a sound signal, wherein, when it is determined, based on the sound signal generated by the sound collecting unit, that an abnormal sound has arisen, the control unit is configured to determine a source of the abnormal sound by transitioning to a second operation mode after the first operation mode has ended and causing, in the second operation mode, one or more members, from the plurality of members, that are possible sources of the abnormal sound to operate separately from the remaining plurality of members.

Further features of the present disclosure will become apparent from the following description of exemplary embodiments (with reference to the attached drawings).

DESCRIPTION OF THE EMBODIMENTS

Figure 1:
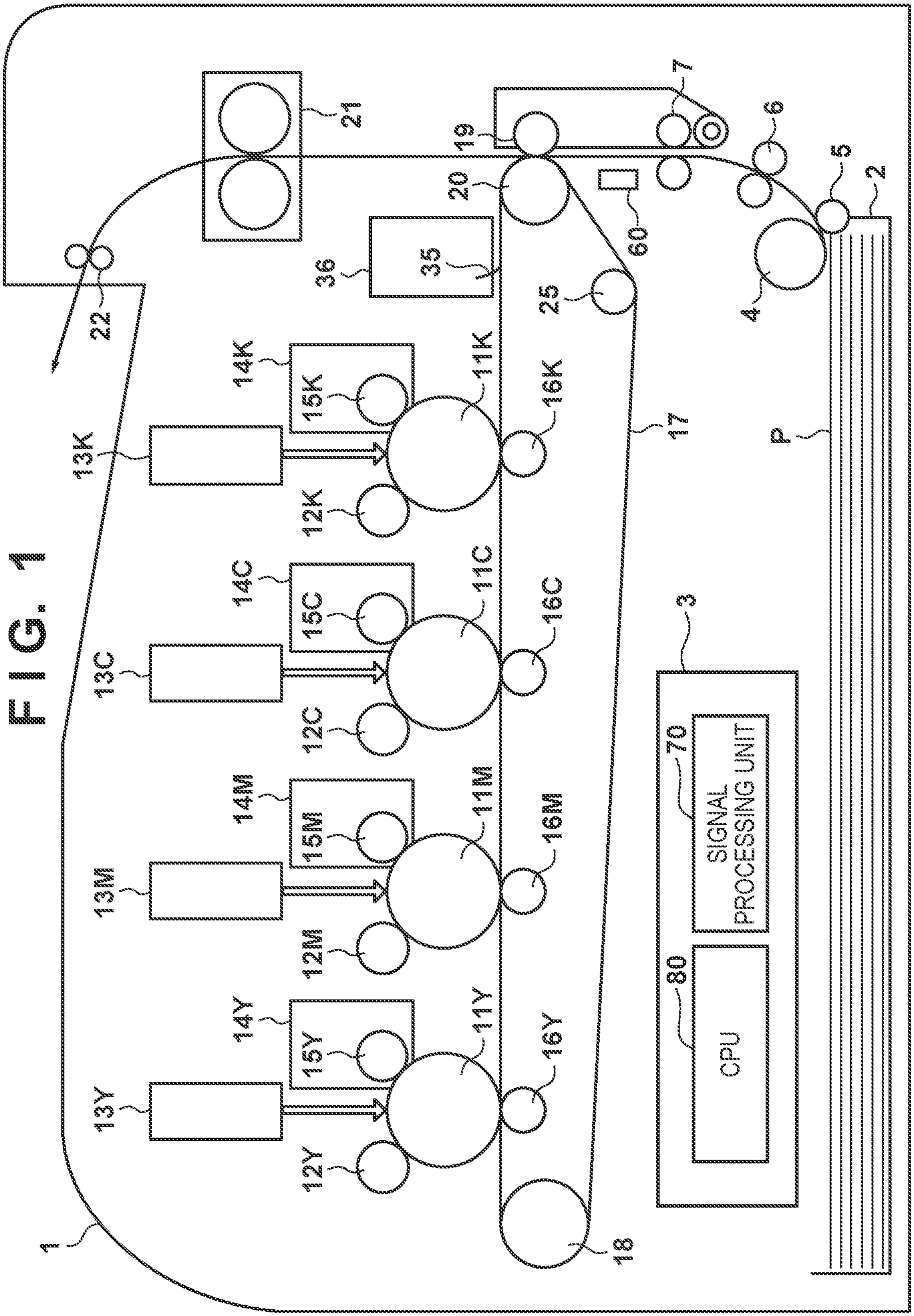
FIG. 1 is a schematic diagram illustrating an example of the overall configuration of an image forming apparatus according to an embodiment.

Hereinafter, embodiments will be described in detail with reference to the attached drawings. Note, the following embodiments are not intended to limit the scope of the disclosure. Multiple features are described in the embodiments, but limitation is not made to an aspect that requires all such features, and multiple such features may be combined as appropriate. Furthermore, in the attached drawings, the same reference numerals are given to the same or similar configurations, and redundant description thereof is omitted.

1. INTRODUCTION

This section will primarily describe an example of techniques according to the present disclosure being applied in a printer. However, the technique according to the present disclosure can be applied in a variety of other types of image forming apparatuses, such as copiers and multifunction peripherals, for example. Unless specified otherwise, each of the constituent elements such as apparatuses, devices, modules, and chips described below may be constituted by a single entity, or may be constituted by multiple physically-distinct entities.

1-1. Overall Apparatus Configuration

FIG. 1 is a schematic diagram illustrating an example of the overall configuration of an image forming apparatus 1 according to an embodiment. It is assumed here that an image forming apparatus 1 is an electrophotographic-type image forming apparatus provided with an abnormality diagnosis function. To be more specific, the image forming apparatus 1 is a tandem-type color laser printer which employs an intermediate transfer belt. However, the technique according to the present disclosure is not limited to this type.

In FIG. 1, the "Y", "M", "C", and "K" appended to the reference signs indicate that the color of toner handled by the corresponding members is yellow, magenta, cyan, or black, respectively. However, the appended letters will be left off the reference numerals in the following descriptions in cases where it is not necessary to distinguish between individual colors. During image formation, a photosensitive member 11, which is an image carrier, is rotationally driven in the clockwise direction in FIG. 1. A charging roller 12 charges a surface of the photosensitive member 11 to a uniform potential. An optical unit 13 forms an electrostatic latent image on the photosensitive member 11 by exposing the photosensitive member 11. A developer 14 contains a developing agent, and forms a developing agent image (an image) by developing the electrostatic latent image on the photosensitive member 11 using a developing roller 15. A primary transfer roller 16 outputs a primary transfer bias, and forms the developing agent image on an intermediate transfer belt 17, which is an image carrier, by transferring the electrostatic latent image on the photosensitive member 11 to the intermediate transfer belt 17. Note that a full-color developing agent image can be formed on the intermediate transfer belt 17 by transferring the developing agent images formed on the photosensitive members 11Y, 11M, 11C, and 11K to the intermediate transfer belt 17 in an overlapping manner.

The intermediate transfer belt 17 is stretched by a drive roller 18, a tension roller 25, and a secondary transfer opposing roller 20, and during image forming, is rotationally driven, in what is the counterclockwise direction in FIG. 1, in response to the drive roller 18 rotating. As a result, the developing agent image transferred to the intermediate transfer belt 17 is transported to a position opposite a secondary transfer roller 19. Meanwhile, a cassette 2 holds pre-transport recording material P in a stacked state. The recording material (also called "paper") P held in the cassette 2 is fed to a transport path by a paper feed roller 4. A separation roller 5 separates one sheet of the recording material P at a time when feeding the recording material P from the cassette 2. When an electromagnetic clutch (not shown) is in a transmissive state, rotational driving force from a paper feed motor (not shown) is transmitted to the paper feed roller 4, and the paper feed roller 4 is rotationally driven as a result. When the electromagnetic clutch is in a shut-off state, the transmission of rotational driving force from the paper feed motor to the paper feed roller 4 is shut off. A transport roller pair 6 transports the fed recording material P downstream in the transport path, through a resistation roller pair 7, and toward a position opposite the secondary transfer roller 19. The secondary transfer roller 19 outputs a secondary transfer bias, and transfers the developing agent image on the intermediate transfer belt 17 onto the recording material P. Note that developing agent remaining on the intermediate transfer belt 17 without being transferred onto the recording material P is collected into a cleaning unit 36 by a cleaning blade 35. After the developing agent image has been transferred, the recording material P is transported by a fixing roller 21. The fixing roller 21 fixes the developing agent image to the recording material P by pressurizing and heating the recording material P. After the developing agent image has been fixed, the recording material P is discharged to a discharge tray by a discharge roller pair 22.

The image forming apparatus 1 further includes a sound collecting unit 60 disposed in the vicinity of the transport path along which the recording material P is transported, as well as a control unit 3. In the example illustrated in FIG. 1, the sound collecting unit 60 is disposed near rollers involved in the feeding of the recording material P. The sound collecting unit 60 is a unit that collects sound arising in the image forming apparatus 1 to generate a sound signal. The sound collecting unit 60 can include a micro-electro mechanical system (MEMS) microphone that converts vibratory displacement in a vibrating plate, caused by pressure, into a change in voltage, as well as an electrode terminal. Note, however, that the sound collecting unit 60 may include any type of sound collecting unit, such as a condenser microphone, instead of a MEMS microphone. The sound collecting unit 60 outputs, to the control unit 3, a sound signal expressing the vibratory displacement in the vibrating plate as a voltage level.

The control unit 3 is connected to various parts of the image forming apparatus 1 by signal lines (not shown). The control unit 3 includes at least a signal processing unit 70 and a CPU 80. As illustrated in FIG. 1, an image forming function of the image forming apparatus 1 is realized by a plurality of members which are each driven by some kind of driving force. The CPU 80 is a control unit that causes the image forming apparatus 1 to form an image by controlling the operations of those members. Upon receiving a print job including image data for printing from an apparatus outside the image forming apparatus 1 (not shown; a host computer, for example), the CPU 80 starts controlling the operations of the various members described with reference to FIG. 1. Several of these members produce sounds during image forming operations. These sounds are collected by the sound collecting unit 60 and converted into sound signals. The signal processing unit 70 processes such sound signals input from the sound collecting unit 60. An example of the configuration of the control unit 3 will be described in further detail later.

1-2. Description

The image forming apparatus 1 includes one or more driving members, as well as driven members which are driven by those driving members. The driving members can include, for example, the paper feed motor, main motors, and a fixing motor. The paper feed motor drives the paper feed roller 4, the separation roller 5, and the transport roller pair 6. The main motors can include, for example, a YMC drum motor, a YMC developing motor, and an intermediate transfer belt—Bk motor. The YMC drum motor drives the photosensitive members 11Y, 11M, and 11C. The YMC developing motor drives the developing rollers 15Y, 15M, and 15C. The intermediate transfer belt—Bk motor drives the drive roller 18 for the intermediate transfer belt 17, the photosensitive member 11K, and the developing roller 15K. The fixing motor drives the fixing roller 21 and the discharge roller pair 22.

Figure 2:
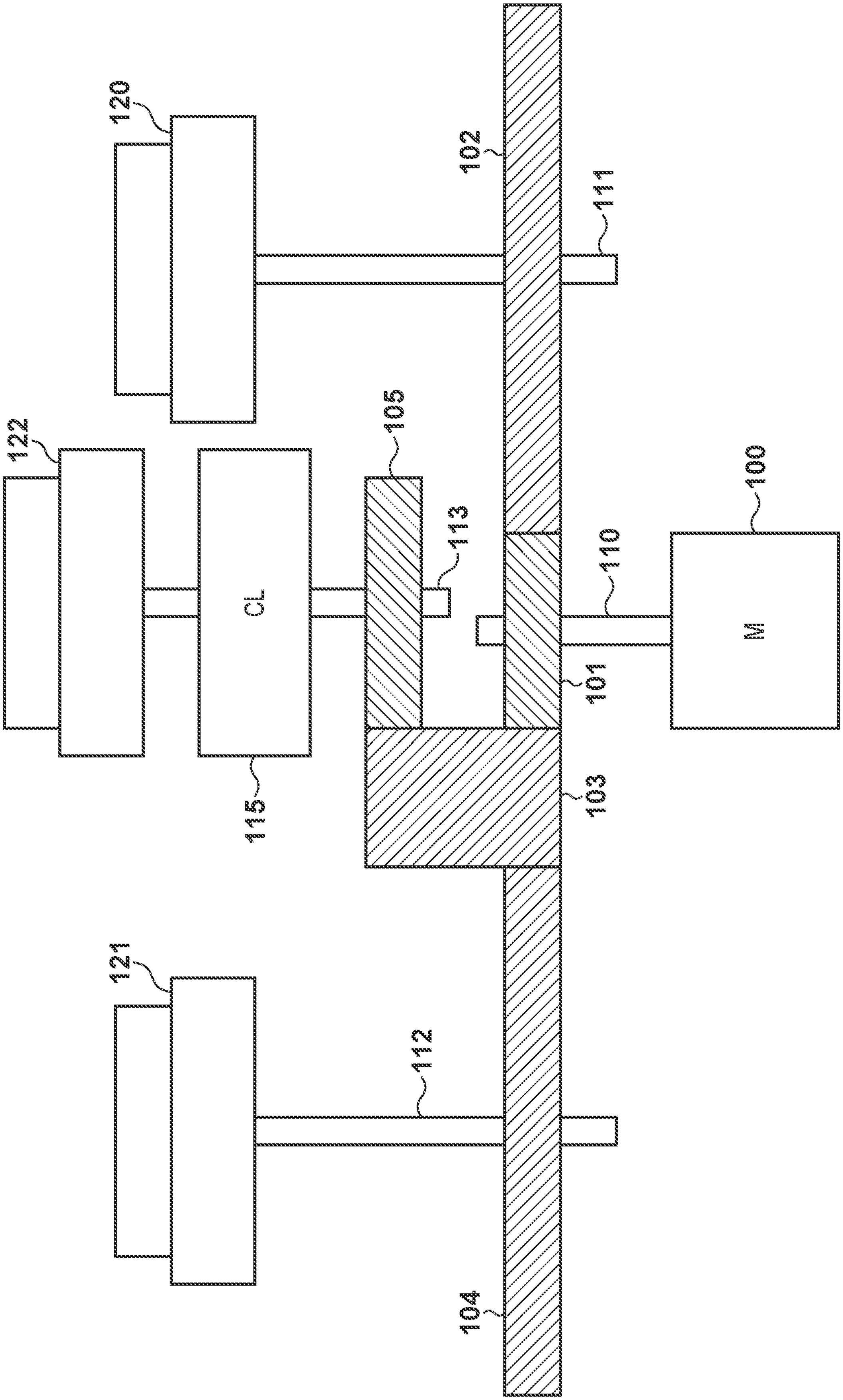
FIG. 2 is a schematic diagram illustrating an example of a driving mechanism in the image forming apparatus according to the embodiment.

FIG. 2 illustrates an intermediate transfer belt—Bk motor 100 and related members as an example of a driving mechanism of the image forming apparatus 1. The motor 100 illustrated in FIG. 2 rotationally drives a pinion gear 101 through a motor shaft 110. The pinion gear 101 meshes with a photosensitive member gear 102 and an idler gear 103, and transmits driving force from the motor 100 to those gears. The photosensitive member gear 102 is rotationally driven about a photosensitive member drive shaft 111 by the driving force transmitted from the pinion gear 101. A photosensitive member coupling 120 is connected to one end of the photosensitive member drive shaft 111, on the side opposite from the side connected to the photosensitive member gear 102, and the photosensitive member coupling 120 is also rotationally driven about the photosensitive member drive shaft 111. The idler gear 103 furthermore meshes with an intermediate transfer belt gear 104 and a developing roller gear 105. The intermediate transfer belt gear 104 is rotationally driven about an intermediate transfer belt drive shaft 112 by the driving force transmitted from the pinion gear 101 and the idler gear 103. An intermediate transfer belt coupling 121 is connected to one end of the intermediate transfer belt drive shaft 112, on the side opposite from the side connected to the intermediate transfer belt gear 104, and the intermediate transfer belt coupling 121 is also rotationally driven about the intermediate transfer belt drive shaft 112. The developing roller gear 105 is rotationally driven about a developing roller drive shaft 113 by the driving force transmitted from the pinion gear 101 and the idler gear 103. The developing roller drive shaft 113 is connected to a developing roller coupling 122 by an electromagnetic clutch 115. The electromagnetic clutch 115 transmits the driving force generated by the motor 100, which serves as a driving unit, to the developing roller coupling 122, or shuts off the transmission of that driving force to the developing roller coupling 122. The switching of the electromagnetic clutch 115 between a transmissive state and a shut-off state is controlled by the aforementioned CPU 80. The photosensitive member coupling 120 is connected to the photosensitive member 11K. The intermediate transfer belt coupling 121 is connected to the drive roller 18. The developing roller coupling 122 is connected to the developing roller 15K. Through this driving mechanism configuration, the motor 100 can drive the photosensitive member 11K, the drive roller 18, and the developing roller 15K, which are driven members.

Specifically, by switching the state of the electromagnetic clutch 115 between the transmissive state and the shut-off state, the CPU 80 can selectively stop or drive the developing roller 15K while the drive roller 18 and the photosensitive member 11K are being driven. For example, the developing roller 15K can be stopped by switching the electromagnetic clutch 115 to the shut-off state while the cleaning unit 36 is cleaning the intermediate transfer belt 17, in order to prevent degradation of the developing agent caused by friction with the developing roller 15K.

The driving members and the driven members such as those described above may produce abnormal sounds with continued use over long periods of time. To identify a member that is the source of an abnormal sound, a method is known in which an acoustic pressure level is analyzed for each of frequency components of sounds collected using a microphone. However, when a plurality of members are producing sounds simultaneously in overlapping bands, a method that simply analyzes the frequency components of sounds cannot correctly separate those sounds from each other. This makes it difficult to accurately identify the source of an abnormal sound. Accordingly, in the present embodiment, the image forming apparatus 1 is provided with a separately-driving mode, which, as will be described in detail hereinafter, is an operation mode for abnormality diagnosis.

2. DETAILED CONFIGURATION

2-1. Example of Configuration of Control Unit

Figure 3:
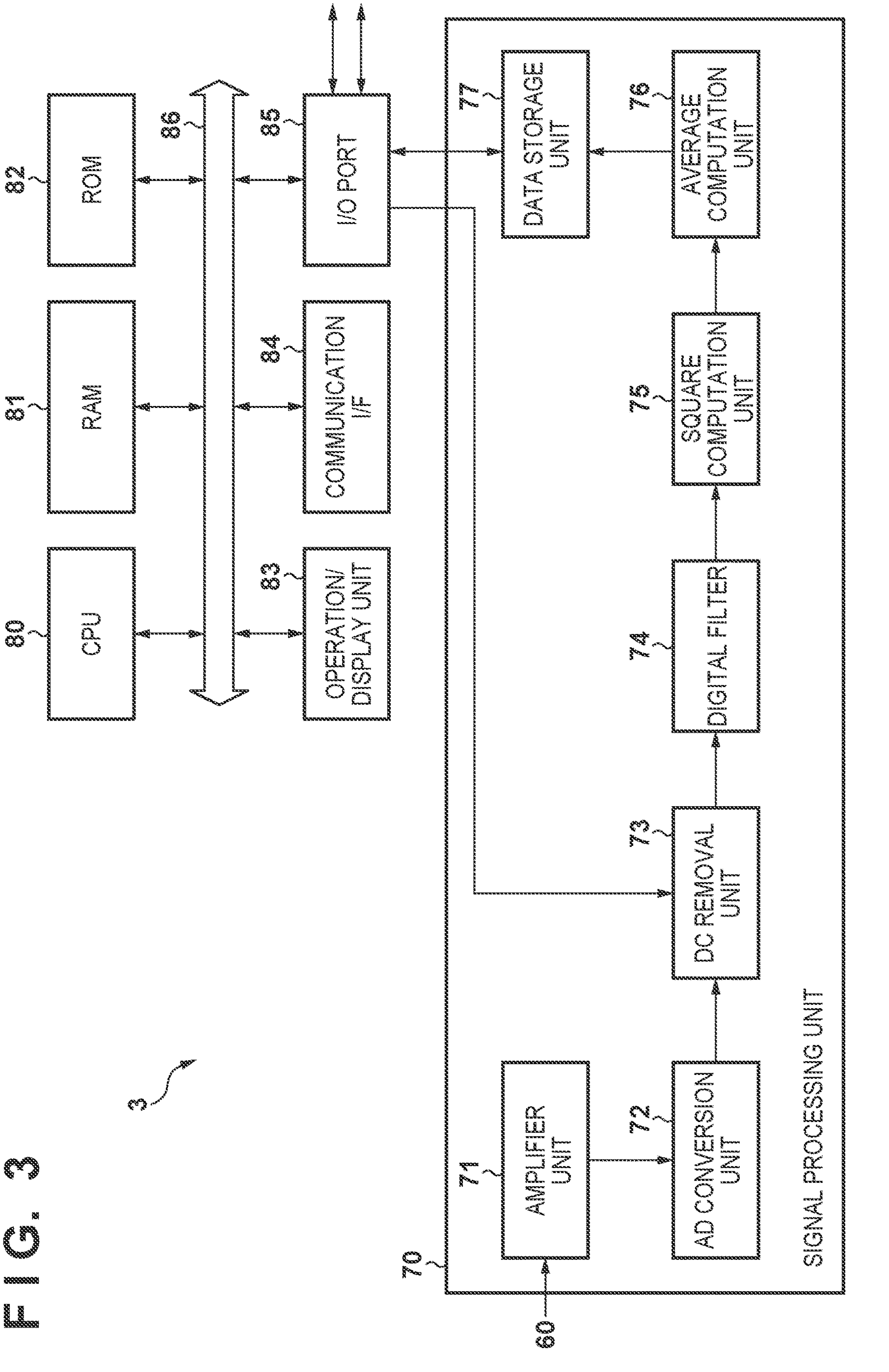
FIG. 3 is a block diagram illustrating, in detail, an example of the configuration of a control unit illustrated in FIG. 1.

FIG. 3 is a block diagram illustrating, in detail, an example of the configuration of the control unit 3 illustrated in FIG. 1. As illustrated in FIG. 3, the control unit 3 includes the signal processing unit 70, the CPU 80, RAM 81, ROM 82, an operation/display unit 83, a communication I/F 84, an I/O port 85, and a bus 86.

The CPU (Central Processing Unit) 80 is a processor that controls the overall functions of the image forming apparatus 1. The RAM (Random Access Memory) 81 is volatile memory, and provides a temporary storage region for tasks performed by the CPU 80. The ROM (Read-Only Memory) 82 is non-volatile memory, and stores programs to be executed by the CPU 80 and data. The CPU 80 implements a control function for the image forming apparatus 1 by, for example, loading a computer program stored in the ROM 82 into the RAM 81 and executing the program. The operation/display unit 83 includes an operation unit for accepting operations made by a user (e.g., an operation panel or operation buttons (not shown)), and a display unit for displaying information. The communication interface (I/F) 84 is an interface for the image forming apparatus 1 to communicate with other apparatuses. The communication I/F 84 may be a wired communication I/F or a wireless communication I/F. The I/O (Input/Output) port 85 is a port for inputting/outputting signals to and from the various members of the image forming apparatus 1, described with reference to FIGS. 1 and 2, and the control unit 3. The signal processing unit 70 is also connected to the I/O port 85. The bus 86 is a signal line that connects the CPU 80, the RAM 81, the ROM 82, the operation/display unit 83, the communication I/F 84, and the I/O port 85 to each other.

The signal processing unit 70 includes an amplifier unit 71, an AD conversion unit 72, a DC removal unit 73, a digital filter 74, a square computation unit 75, an average computation unit 76, and a data storage unit 77. The amplifier unit 71 amplifies the signal level of a sound signal input from the sound collecting unit 60. The AD (Analog to Digital) conversion unit 72 generates a digital sound signal by executing AD conversion on the amplified sound signal input from the amplifier unit 71. The DC removal unit 73 converts the digital sound signal into a signal expressing fluctuations in a sound wave level (acoustic pressure) by removing a DC component. A reference value for the DC component to be removed can be communicated from the CPU 80. The digital filter 74 extracts a frequency component of a specific pass band from the sound signal from which the DC component has been removed. The digital filter 74 may be a low-pass filter, a band pass filter, or a high-pass filter, and the pass band of the digital filter 74 can be set in a variable manner by the CPU 80. The square computation unit 75 squares the signal value of the sound signal filtered by the digital filter 74. The average computation unit 76 calculates a segment average of the sound signal input from the square computation unit 75, for each of time segments having a given time length. The time length of each segment may be a fixed length such as, for example, 30 ms, or may be set in a variable manner (e.g., selected from a plurality of time length candidates, or set to a desired value). The sound signal is shaped through the stated squaring and segment averaging, resulting in time-series sound data expressing an acoustic pressure fluctuation level for each of the time segments. As a result of this signal shaping, sound levels for the purpose of abnormality diagnosis can be compared with each other with a high level of precision. The data storage unit 77 stores the time-series sound data calculated as the segment average result by the average computation unit 76.

In a normal mode (also called a "first operation mode"), the CPU 80 monitors the sound data output from the data storage unit 77 through the I/O port 85 while executing image formation by controlling the operations of the members described with reference to FIGS. 1 and 2. For example, when the signal level expressed by the read-out sound data exceeds a predefined threshold, the CPU 80 can determine that an abnormal sound has arisen. In the present embodiment, upon determining that an abnormal sound has arisen, the CPU 80 can switch the operation mode from the normal mode to a separately-driving mode (also called a "second operation mode"). The switch (also called a "transition") from the normal mode to the separately-driving mode is performed, for example, after the normal mode has ended (after the image forming operations are complete). In the separately-driving mode, the CPU 80 determines the source of the abnormal sound that has arisen by identifying one or more members that is a possible source of an abnormal sound and driving at least one of the identified one or more members separately from the other members.

2-2. Narrowing Down the Source of an Abnormal Sound

Figure 4A:
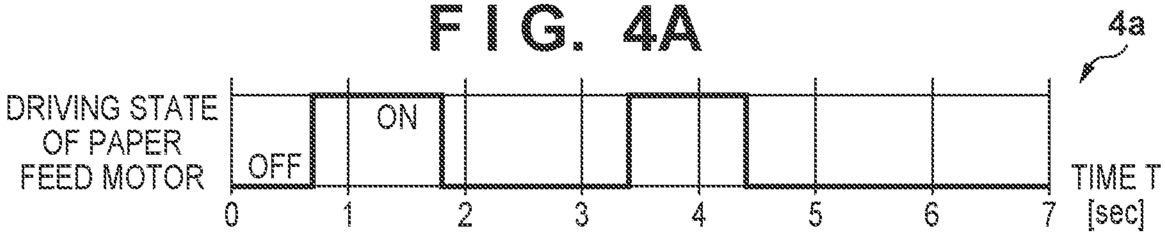
FIGS. 4A to 4E are descriptive diagrams illustrating an example of a method for identifying a member which is a possible source of an abnormal sound.
Figure 4B:
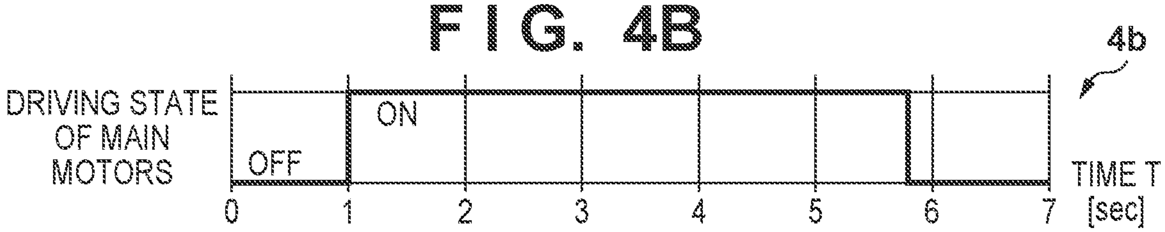
Figure 4C:
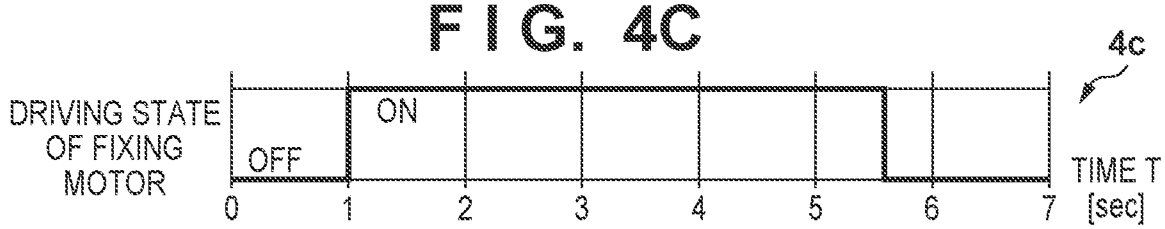

FIGS. 4A to 4E are descriptive diagrams illustrating an example of a method for identifying a member which is a possible source of an abnormal sound. In FIGS. 4A to 4C, graphs 4*a*, 4*b*, and 4*c* represent the driving states of the paper feed motor, the main motors, and the fixing motor, respectively, during image forming operations, as time progresses. The driving state of each motor is "driving" (on) or "stopped" (off).

In graphs 4*a* to 4*c*, the execution of a print job starts at time T=0 (sec). The paper feed motor starts operating at time T=0.8, and the paper feed roller 4, which is driven by the paper feed motor, feeds the first sheet of the recording material P into the transport path. The paper feed motor stops at time T=1.8. The main motors start operating at time T=1.0, and the photosensitive member 11, the developing roller 15, and the drive roller 18, which are driven by the main motors, engage in forming an image on the recording material P. The fixing motor also starts operating at time T=1.0, and after the temperature of the fixing roller 21 has been adjusted to a target temperature, the fixing roller 21, which is driven by the fixing motor, fixes the image onto the recording material P. The paper feed motor resumes operating at time T=3.4, and the paper feed roller 4 feeds the next sheet into the transport path. The paper feed motor stops again at time T=4.4.

Figure 4D:
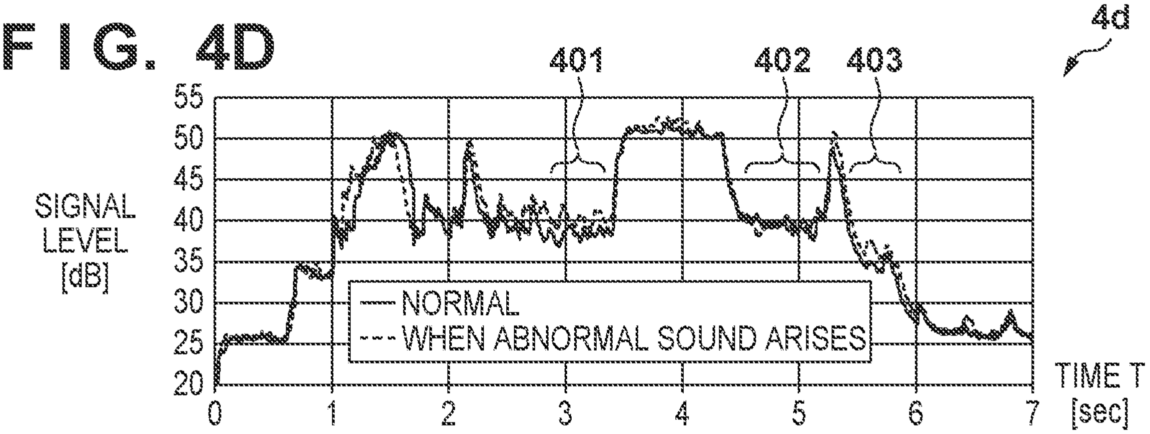
Figure 4E:
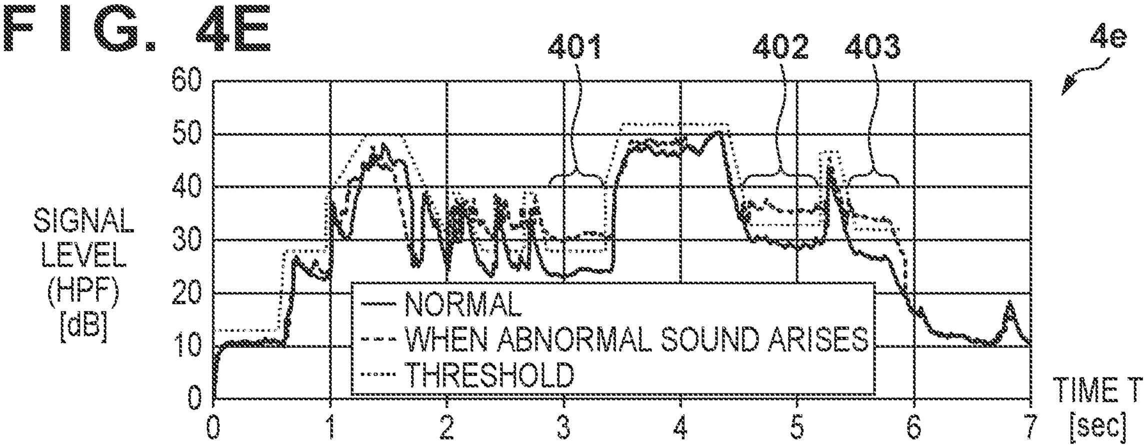

Graphs 4*d* and 4*e* in FIGS. 4D and 4E represent the transitions in the signal level expressed by the sound data generated by the signal processing unit 70, along the same time axis as that used in graphs 4*a* to 4*c*. Graph 4*d* represents the signal level when the digital filter 74 allows all frequency components to pass (i.e., when there is no filtering). On the other hand, graph 4*e* represents the signal level when the digital filter 74 allows only high-frequency components of 4 kHz or higher to pass (i.e., when high-pass filtering is applied). The solid lines in the graphs represent examples of the transitions in the signal level during normal operations, when no abnormal sounds have arisen, whereas the broken lines represent examples of the transitions in the signal level when an abnormal sound has arisen. The dotted line in graph 4*e* represents a threshold for detecting an abnormal sound, which can be set in advance on the basis of the signal level during normal operations. Note that the length of each time segment of the sound data in graphs 4*d* and 4*e* is 30 msec.

When a roller which is a driven member is used continuously for a long period of time (e.g., exceeding the roller's expected lifetime), there are cases where, for example, friction between the roller and a shaft bearing causes high-frequency sounds, greater than or equal to several kHz, to arise. A high-pass filter pass band (or cutoff frequency) of 4 kHz or higher is set in order to catch such abnormal sounds from the roller caused by such friction. As indicated by graph 4*d*, the lack of filtering results in there being almost no difference between the signal level of the sound during normal operations and the signal level of the sound during an abnormality, and as such, no abnormal sound is detected.

However, in graph 4*e*, the signal level of the sound during an abnormality, based on the frequency components passing through the high-pass filter, exceeds the threshold in three periods, namely periods 401, 402, and 403. As such, the CPU 80 can determine that an abnormal sound has arisen at these times. This threshold for abnormality diagnosis can be stored in the ROM 82 in advance, for example, as a sequence of values that change over time. Due to its correlation with the pass band (or cutoff frequency) settings of the digital filter 74 and the settings for the length of the time segment, the threshold may be stored in association with those setting values.

As can be understood from graphs 4*a* to 4*c*, the main motors and the fixing motor were operating in the periods 401, 402, and 403 in which it was determined that an abnormal sound had arisen. Accordingly, the CPU 80 can identify a member related to the main motors or the fixing motor as a member that is a possible source of the abnormal sound. In this manner, by comparing the timing at which the abnormal sound arises with the driving states of the respective members, the CPU 80 can identify one or more members which may be a possible source of the abnormal sound. However, this alone will not lead to a determination as to which of two or more members operating in parallel is actually producing the abnormal sound. As such, in the present embodiment, the CPU 80 switches the operation mode to the separately-driving mode in order to determine the source at a finer level.

2-3. Determining Source Using Separately-Driving Mode

In the separately-driving mode, the CPU 80 operates at least one of the members that is a possible source of the abnormal sound, but while doing so, does not operate other members which operate in parallel with that member in the normal mode.

(1) First Example

As described above, each of the driving units in the image forming apparatus 1, such as the paper feed motor, the main motors, and the fixing motor, generates driving force for operating one or more driven members. Accordingly, as a first example, the CPU 80 may, in the separately-driving mode, stop a given motor and maintain a state in which the corresponding driven member is not operated, while causing another motor to generate driving force and operate the corresponding driven member.

Figure 5A:
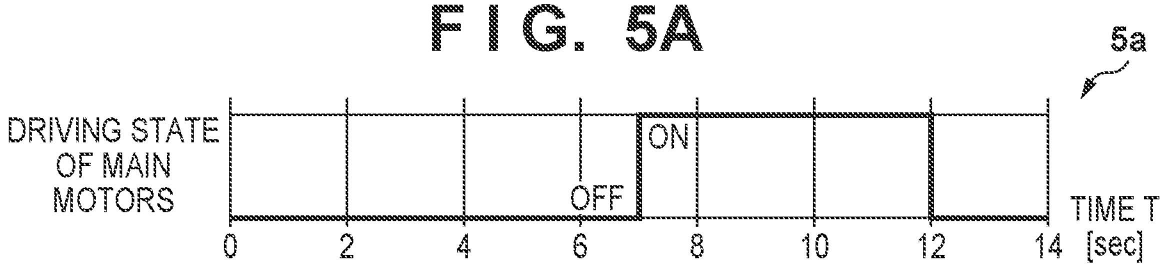
FIGS. 5A to 5C are descriptive diagrams illustrating a first example of a method for identifying a source of an abnormal sound.
Figure 5B:
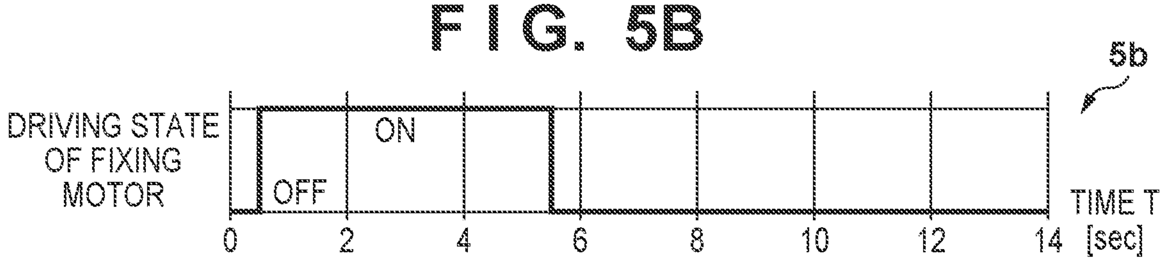
Figure 5C:
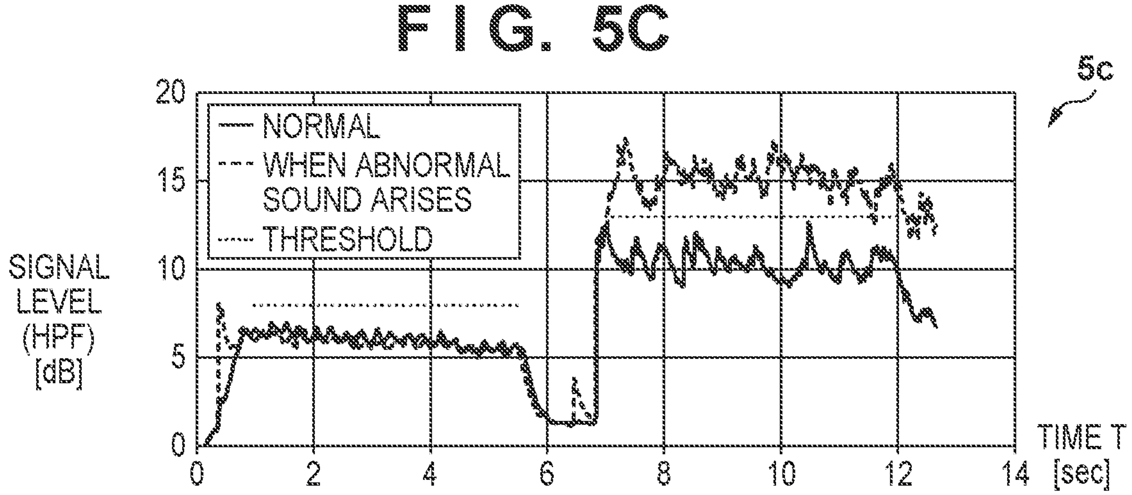

FIGS. 5A to 5C are descriptive diagrams illustrating the first example of the method for identifying a source of an abnormal sound. In FIGS. 5A and 5B, graphs 5*a* and 5*b* represent the driving states of the main motors and the fixing motor, respectively, during operations in the separately-driving mode, as time progresses. In graphs 5*a* and 5*b*, the main motors are kept in a stopped state, whereas the fixing motor is kept in a driving state, during a period from time T=0.5 to time T=5.5. After this, both the main motors and the fixing motor are in the stopped state until time T=7.0. The main motors are kept in the driving state, whereas the fixing motor is kept in the stopped state, during a period from time T=7.0 to time T=12.0.

Graph 5*c* in FIG. 5C represents the transitions in the signal level expressed by the sound data generated by the signal processing unit 70, along the same time axis as that used in graphs 5*a* and 5*b*. It is assumed here that a high-pass filter which allows high-frequency components of 4 kHz or higher to pass is applied to the sound signal, and that a time average is calculated for every 30-msec time segment. As can be understood from graphs 5*a* to 5*c*, the signal level of the sound data is continually below the threshold while the fixing motor is operating, whereas the signal level of the sound data exceeds the threshold while the main motors are operating. The CPU 80 can determine that a driven member driven by the main motors is producing an abnormal sound on the basis of such a comparison between the sound data and the threshold during operations in the separately-driving mode.

Likewise, the CPU 80 may further drive the YMC drum motor, the YMC developing motor, and the intermediate transfer belt—Bk motor out of the main motors separately, for example, and furthermore determine which motor is relevant to the production of the abnormal sound.

(2) Second Example

The transmission of driving force from a driving unit to a given driven member can be controlled to turn off and on by a transmission unit provided between the driving unit and the driven member. For example, as described above, the intermediate transfer belt—Bk motor is connected to the developing roller 15K by the electromagnetic clutch 115. Thus as a second example, in the separately-driving mode, the CPU 80 may control a transmission unit so that the transmission of driving force to the driven member connected to that transmission unit is shut off, while operating another driven member which is driven by that driving force.

Figure 6A:
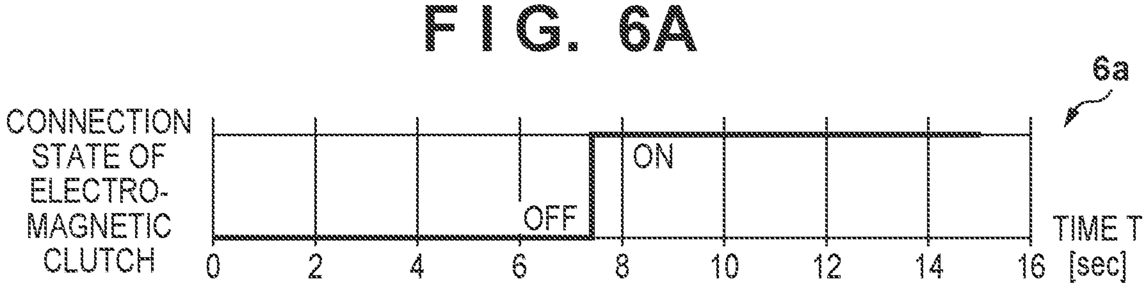
FIGS. 6A and 6B are descriptive diagrams illustrating a second example of a method for identifying a source of an abnormal sound.
Figure 6B:
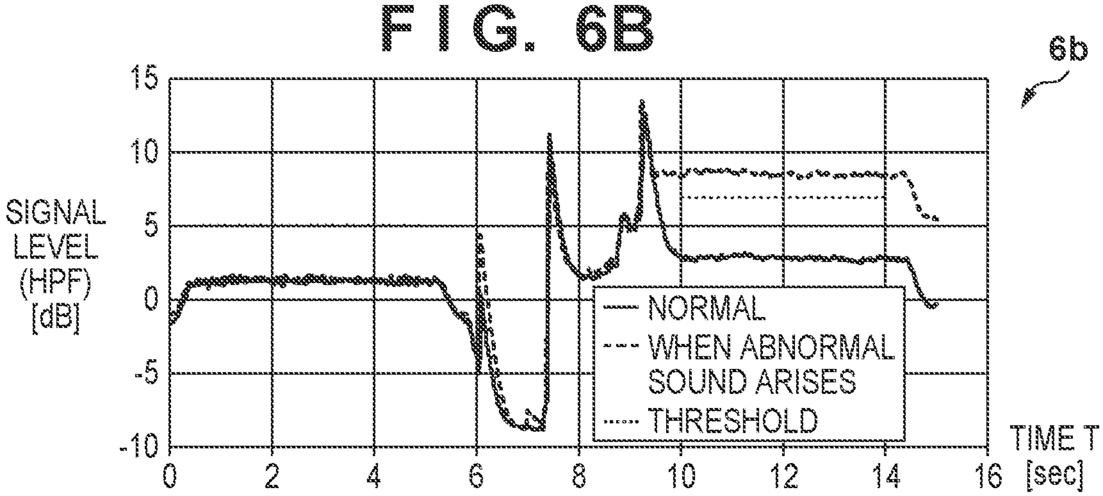

FIGS. 6A and 6B are descriptive diagrams illustrating the second example of the method for identifying a source of an abnormal sound. In FIG. 6A, graph 6*a* represents a connection state of the electromagnetic clutch 115 during operation in the separately-driving mode, as time progresses. In graph 6*a*, prior to time T=7.5, the state of the electromagnetic clutch 115 is kept in the shut-off state, and the state of the electromagnetic clutch 115 is switched to the transmissive state at time T=7.5. Note that the intermediate transfer belt—Bk motor is assumed to continue operating from before to after the switch of the state of the electromagnetic clutch 115.

Graph 6*b* in FIG. 6B represents the transitions in the signal level expressed by the sound data generated by the signal processing unit 70, along the same time axis as that used in graph 6*a*. As can be understood from graphs 6*a* and 6*b*, when the electromagnetic clutch 115 is being kept in the shut-off state, the signal level of the sound data is continually below the threshold, whereas when the electromagnetic clutch 115 is in the transmissive state, the signal level of the sound data exceeds the threshold. The CPU 80 can determine that the developing roller 15K connected to the electromagnetic clutch 115 is producing an abnormal sound on the basis of such a comparison between the sound data and the threshold during operations in the separately-driving mode.

As described above, in the separately-driving mode, the CPU 80 can determine the source of an abnormal sound by operating at least one first member, which is a possible source of an abnormal sound, without operating a second member that, in the normal mode, operates in parallel with the first member. In the above-described first example, the first member and the second member are members driven by different driving members. Meanwhile, in the second example, the first member and the second member are members driven by the same driving member, but the transmission of driving force to the second member is shut off by the transmission unit.

Although the developing roller 15K is the source of an abnormal sound in the second example described here, the present embodiment can also be applied in cases where another type of roller, or a member aside from a roller (e.g., a gear, a shaft bearing, a belt, or the like) is the source of an abnormal sound. The CPU 80 may change operating parameters used in the separately-driving mode in accordance with which member is the subject of the abnormality diagnosis. For example, operating parameters which can be set in a variable manner can include at least one of the pass band of the digital filter 74, the length of the time segment for the averaging performed by the average computation unit 76, the temperature of the fixing roller 21, and the rotational speed of each motor.

2-4. Notification Pertaining to Source of Abnormal Sound

The CPU 80 may display, in the operation/display unit 83, information pertaining to the source of the abnormal sound determined through the method described above. The CPU 80 may also transmit information pertaining to the source of the abnormal sound to another apparatus through the communication I/F 84. The information pertaining to the source of the abnormal sound can include at least one of, for example, the name, model number, and physical location within the apparatus of the member producing the abnormal sound. Additional information, such as the date/time when the abnormal sound has arisen and the level of the abnormal sound, may be displayed or transmitted along with the information pertaining to the source of the abnormal sound. Furthermore, the CPU 80 may display a message prompting replacement of the member that is the source of the abnormal sound in a screen, or transmit the message to another apparatus. The communication I/F 84 may transmit the information pertaining to the source of the abnormal sound to a remotely-located administrative center over a network such as a Local Area Network (LAN) or the Internet. Such notifications make it possible for a local user or a remote managing user to perform maintenance work, such as arranging a new member and replacing the old member with the new member, at an appropriate time.

2-5 Timing for Transitioning to Separately-Driving Mode

Upon detecting an abnormal sound on the basis of the sound data generated by the signal processing unit 70, the CPU 80 switches the operation mode of the image forming apparatus 1 from the normal mode to the separately-driving mode and determines the source of the abnormal sound. For example, the switch to the separately-driving mode may be performed after a job has been executed in the normal mode. In other words, the CPU 80 may cause the image forming apparatus 1 to operate in the separately-driving mode following the execution of a job in the normal mode.

Figure 7A:
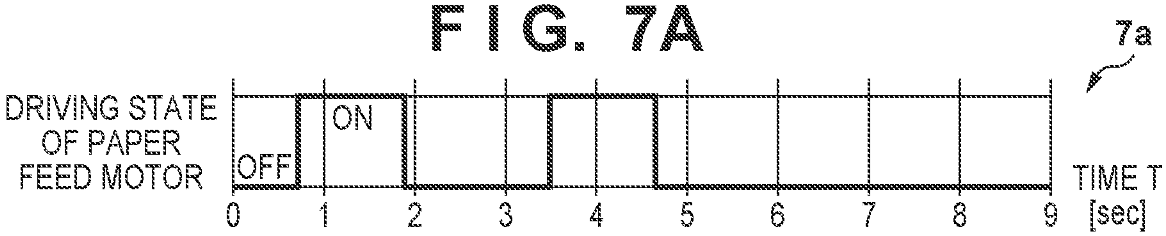
FIGS. 7A to 7D are first descriptive diagrams illustrating operations in a separately-driving mode that follows the execution of a job in a normal mode.
Figure 7B:
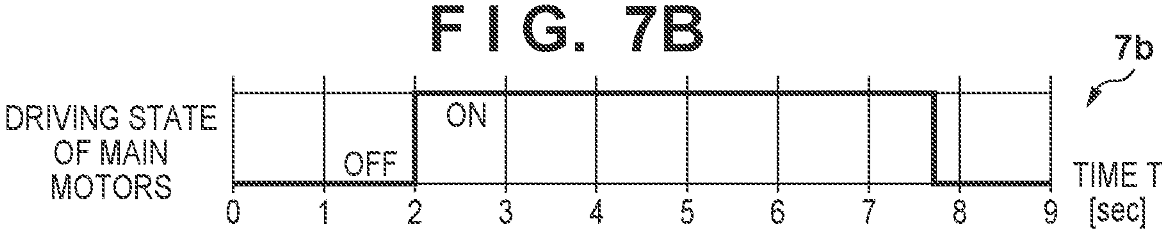
Figure 7C:
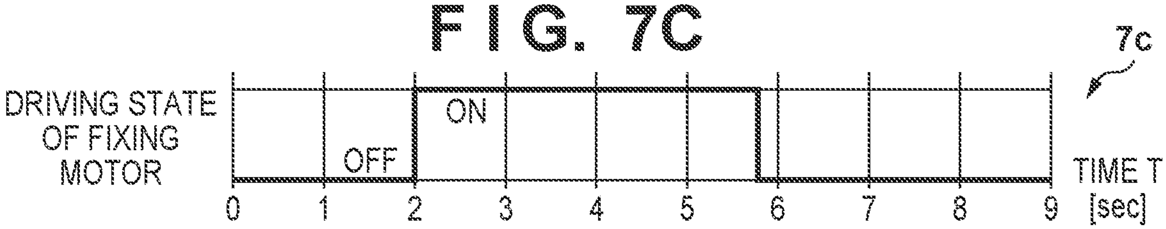
Figure 7D:
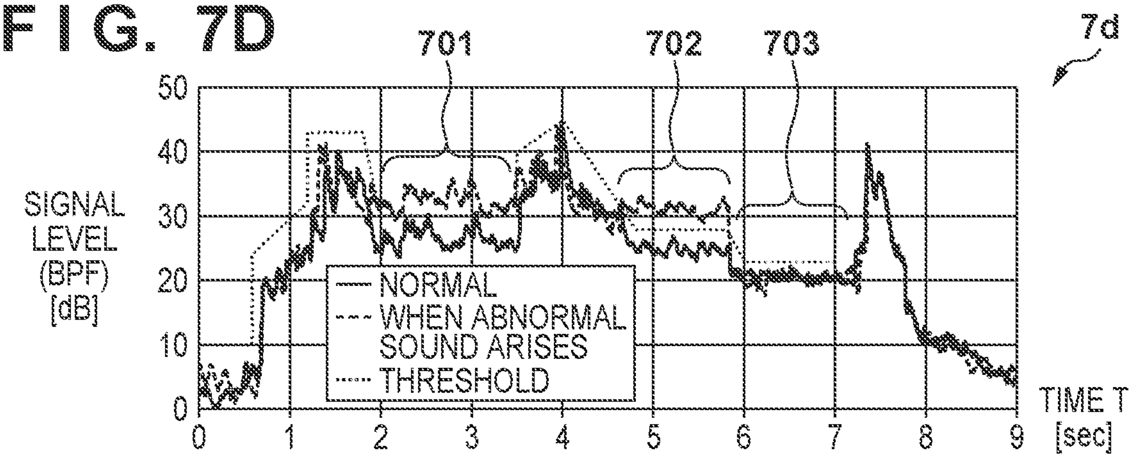
Figure 8A:
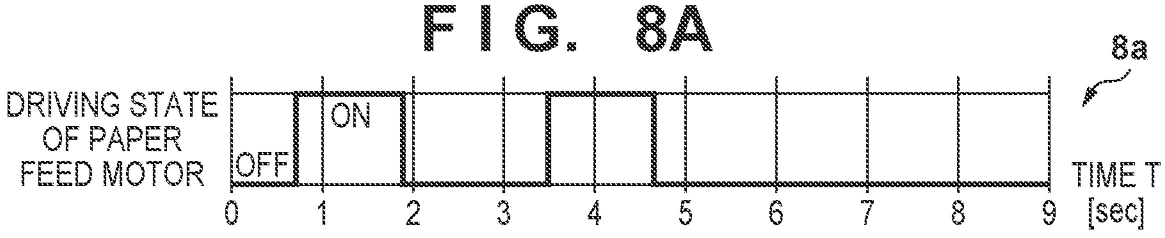
FIGS. 8A to 8D are second descriptive diagrams illustrating operations in the separately-driving mode that follows the execution of a job in a normal mode.
Figure 8B:
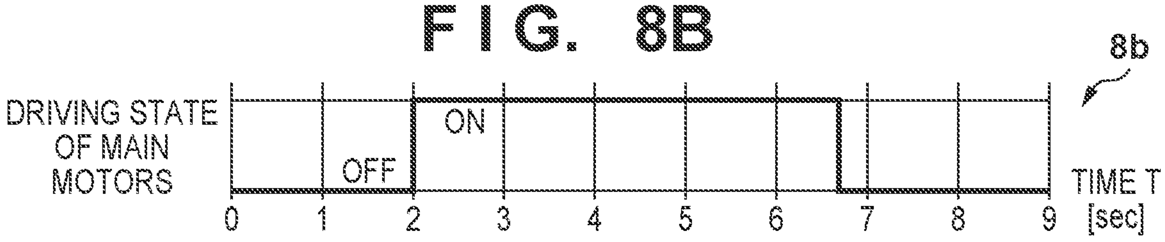
Figure 8C:
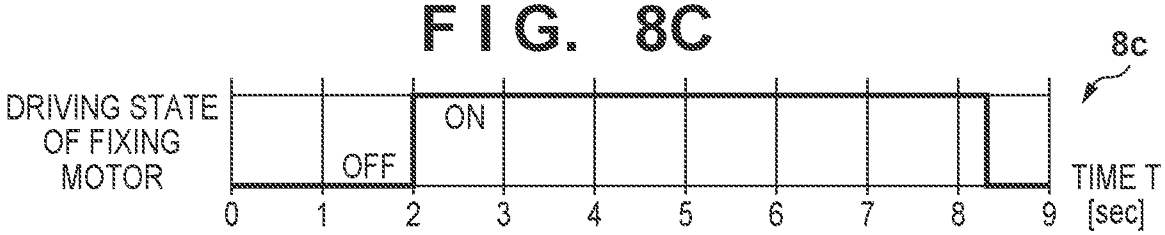
Figure 8D:
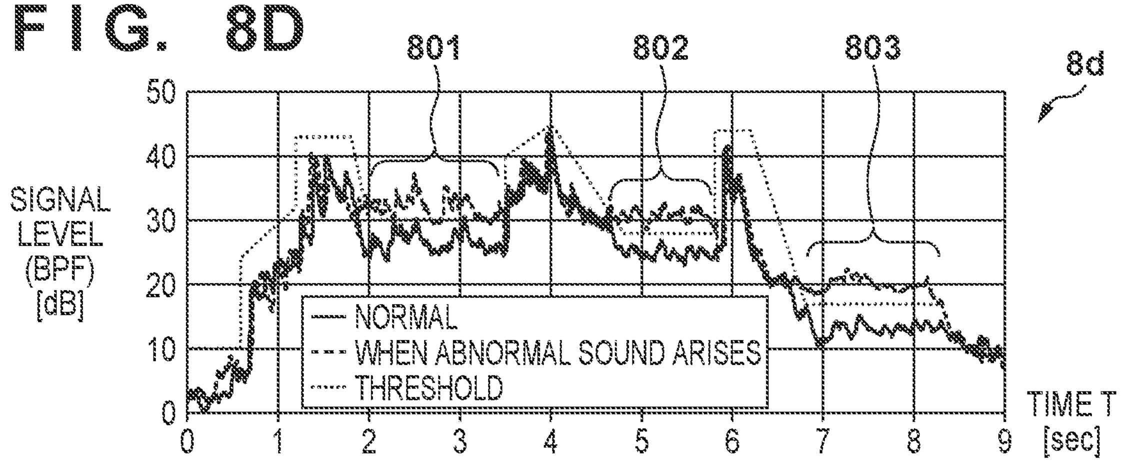

FIGS. 7A to 7D and 8A to 8D are descriptive diagrams illustrating operations in the separately-driving mode that follows the execution of a job in the normal mode. In FIGS. 7A to 7C, graphs 7*a*, 7*b*, and 7*c* represent the driving states of the paper feed motor, the main motor group, and the fixing motor, respectively, as time progresses.

Specifically, referring to the graphs, the execution of a print job starts at time T=0 (sec). The paper feed motor starts operating at time T=0.8, and the paper feed roller 4, which is driven by the paper feed motor, feeds the first sheet of the recording material P into the transport path. The paper feed motor stops at time T=1.9. The main motors start operating at time T=1.0, and the photosensitive member 11, the developing roller 15, and the drive roller 18, which are driven by the main motors, engage in forming an image on the recording material P. The fixing motor also starts operating at time T=1.0, and after the temperature of the fixing roller 21 has been adjusted to a target temperature, the fixing roller 21, which is driven by the fixing motor, fixes the image onto the recording material P. The paper feed motor resumes operating at time T=3.5, and the paper feed roller 4 feeds the next sheet into the transport path. The paper feed motor stops again at time T=4.6. The execution of the print job ends, for example, at time T=5.8, when the second sheet is discharged.

Graph 7*d* represents the transitions in the signal level expressed by the sound data generated by the signal processing unit 70, along the same time axis as that used in graphs 7*a* to 7*c*. It is assumed here that a band pass filter which allows frequency components in a 200- to 500-Hz pass band to pass is applied to the sound signal. Such a pass band setting is effective when, for example, a change in the meshing of gears, caused by wear in the gears, is the source of an abnormal sound. As can be understood from graphs 7*a* to 7*c*, the signal level of the sound data exceeds the threshold in periods 701 and 702, in which the paper feed motor is not operating but the main motors and the fixing motor are operating. When the number of times an abnormal sound has been detected in this manner during operations in the normal mode reaches an upper limit value, the CPU 80 can determine to switch the operation mode to the separately-driving mode once the print job ends. A member related to the main motors or the fixing motor is a member that is a possible source of the abnormal sound.

Focusing on graphs 7*a* to 7*c*, in period 703 following the end of the execution of the print job, the paper feed motor and the fixing motor remain in the stopped state, and only the main motors are operating. According to graph 7*d*, the signal level of the sound data does not exceed the threshold in period 703. Based on this result, the CPU 80 can determine that, out of the main motors and the fixing motor, the source of the abnormal sound is related to the fixing motor.

In the example illustrated in FIGS. 8A to 8D, an abnormal sound is detected in periods 801 and 802, during which a print job is being executed in the normal mode, as in the example described above. As can be understood from graphs 8*a* to 8*c*, during this period, the paper feed motor is not operating, and the main motors and the fixing motor are operating. Accordingly, the CPU 80 can identify a member related to the main motors and the fixing motor as a member which is a possible source of the abnormal sound, and can determine to switch the operation mode to the separately-driving mode following the end of the print job.

In period 803, which follows the end of the execution of the print job, the paper feed motor and the main motors are kept in the stopped state, and only the fixing motor is operating. According to graph 8*d*, the signal level of the sound data exceeds the threshold in period 803. Based on this result too, the CPU 80 can determine that the source of the abnormal sound is related to the fixing motor.

By performing the abnormality diagnosis in the separately-driving mode following the execution of a job in the normal mode, a situation where the apparatus bothers the user by operating suddenly, at a time when the user does not expect the apparatus to operate for abnormality diagnosis, can be avoided. Furthermore, because the source of an abnormal sound can be determined soon after detecting the abnormal sound, apparatus downtime can be kept to a minimum.

Note that the source of an abnormal sound need not be determined from the result of a single instance of operating in the separately-driving mode. For example, the CPU 80 may switch the operation mode to the separately-driving mode after each execution of a plurality of jobs, and the source of the abnormal sound may be determined by comprehensively considering the results of the plurality of operations in the separately-driving mode. In this case, which members to operate and which members to stop in a given separately-driving mode may be determined on the basis of the results of the operations in the previous separately-driving mode.

When an abnormal sound has been detected, the CPU 80 may make a request to the user, through a user interface (e.g., the operation/display unit 83), to approve the switch to the separately-driving mode, and may then switch the operation mode to the separately-driving mode upon the user approving the switch. This makes it possible to avoid a situation in which operations in the separately-driving mode are performed at a time when user does not wish to diagnose an abnormality. Additionally or alternatively, the CPU 80 may propose a switch to the separately-driving mode to the user when making settings based on user inputs prior to an execution of a job.

3. Flow of Processing

Figure 9:
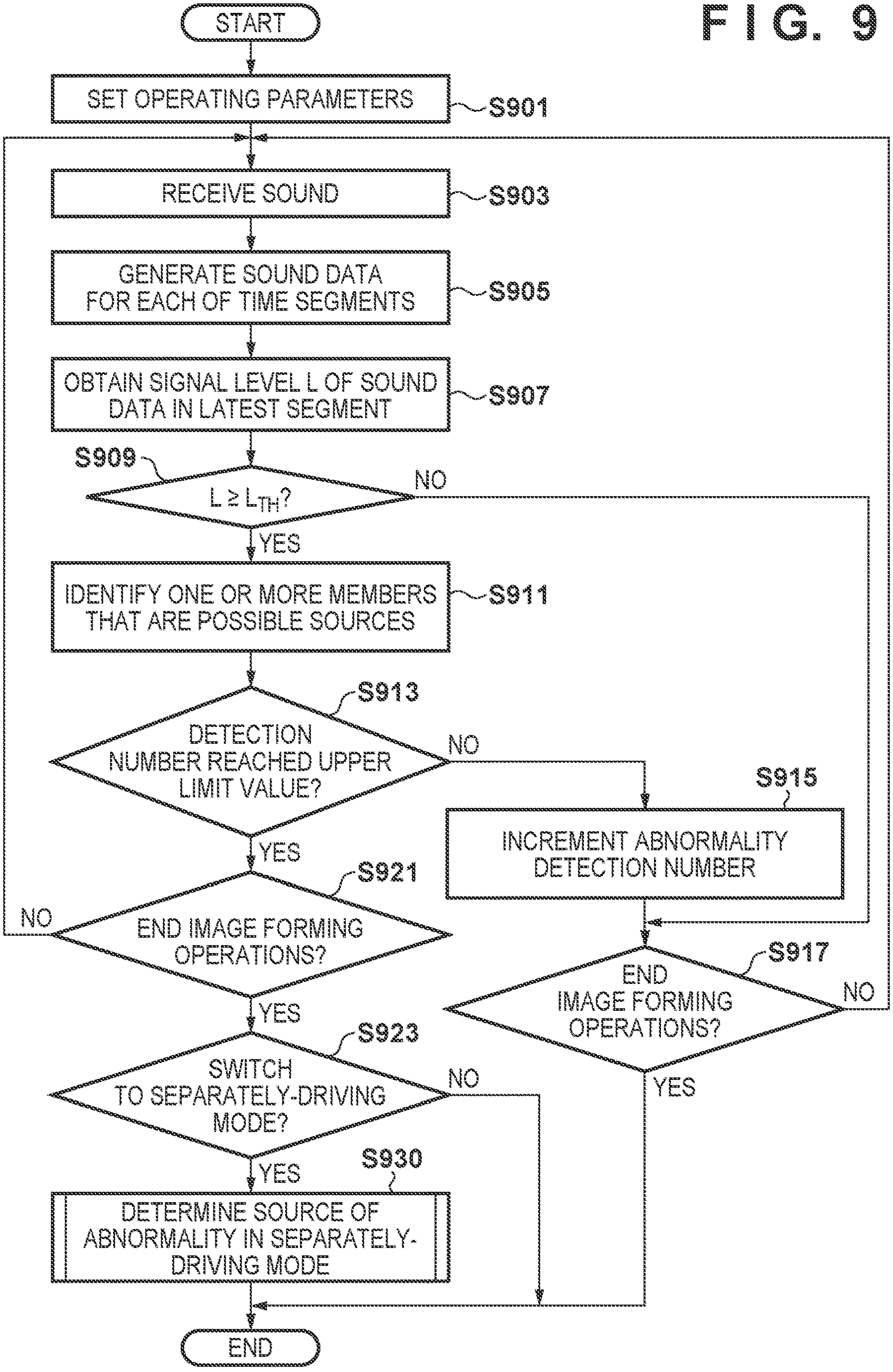
FIG. 9 is a flowchart illustrating an example of the flow of abnormality diagnosis processing executed in the embodiment.

FIG. 9 is a flowchart illustrating an example of the flow of abnormality diagnosis processing executed by the image forming apparatus 1 in the embodiment. The abnormality diagnosis processing illustrated in FIG. 9 can be realized by, for example, a combination of hardware such as the sound collecting unit 60 and the signal processing unit 70 (a microphone, one or more analog circuits, and one or more digital circuits) and software (a computer program) executed by the CPU 80. The computer program can, for example, be loaded into the RAM 81 from the ROM 82 and executed by the CPU 80. Note that, in the following descriptions, the processing steps may be indicated by an S, indicating "step".

First, in step S901, when image forming operations start, the CPU 80 sets the operating parameters, such as the pass band of the digital filter 74 and the length of the time segment used by the average computation unit 76. For example, the CPU 80 may set the pass band of the digital filter 74 in accordance with the member subject to the abnormality diagnosis. Which member is subject to the abnormality diagnosis may be specified by the user, or may be selected on the basis of the results of past operations. Additionally, the CPU 80 may set the length of the time segment for averaging in accordance with a transport speed or an image forming speed. These operating parameters may be set, for example, each time a job is executed.

Next, when image forming operations are started by an image forming unit including a plurality of members of the image forming apparatus 1, in step S903, the sound collecting unit 60 receives a sound, generates a sound signal, and outputs the generated sound signal to the signal processing unit 70. Next, in step S905, the signal processing unit 70 executes processing including AD conversion, DC component removal, filtering, squaring, and averaging on the sound signal input from the sound collecting unit 60, and generates sound data expressing the level of the sound for each of time segments. The sound data generated by the signal processing unit 70 is stored in the data storage unit 77.

Next, in step S907, the CPU 80 obtains a signal level L of the sound data in the latest time segment from the data storage unit 77. Then, in step S909, the CPU 80 determines whether the obtained signal level L is greater than or equal to a threshold $L_{TH}$, i.e., whether the condition $L \geq L_{TH}$ is satisfied. Here, the sequence moves to step S911 when the condition $L \geq L_{TH}$ is satisfied. The sequence moves to step S917 when the condition $L \geq L_{TH}$ is not satisfied.

The condition $L \geq L_{TH}$ being satisfied in step S909 means that an abnormal sound has been detected in the latest time segment. In this case, in step S911, the CPU 80 identifies one or more members that are possible sources of the abnormal sound that has arisen. For example, members operating at the time when the abnormal sound has arisen can be candidates for a member that is the source of the abnormal sound. The CPU 80 may identify the candidates for the member that is the source of the abnormal sound taking the pass band set in the digital filter 74 in account, as well as the timing at which the abnormal sound has arisen. Here, it is assumed that the CPU 80 holds a counter indicating a number of times an abnormal sound has been detected (called an "abnormality detection number" hereinafter) as a control variable. In step S913, the CPU 80 determines whether the abnormality detection number has reached an upper limit value. The sequence moves to step S915 when the abnormality detection number has not reached the upper limit value. Meanwhile, the sequence moves to step S921 when the abnormality detection number has reached the upper limit value. The upper limit value compared with the abnormality detection number may be set in a variable manner in accordance with parameters such as the pass band of the digital filter 74, the length of the time segment, the type of the recording material, or an image forming mode (e.g., power saving, quality priority/speed priority, color mode, or the like).

When the abnormality detection number has not reached the upper limit value, in step S915, the CPU 80 increments the abnormality detection number (adds 1 to the counter). Next, in step S917, the CPU 80 determines whether or not to end the image forming operations. For example, when the execution of a print job is underway, the CPU 80 determines not to end the image forming operations. In this case, the sequence returns to step S903, and the above-described processing is repeated for the sound arising in the next time segment. When the CPU 80 determines to end the image forming operations, the abnormality diagnosis processing illustrated in FIG. 9 ends.

When the abnormality detection number has reached the upper limit value, in step S921, the CPU 80 determines whether or not to end the image forming operations. For example, when the execution of a print job has ended and there is no print job next in the queue, the CPU 80 can determine to end the image forming operations. Meanwhile, when the execution of a print job is underway or there is a print job next in the queue, the CPU 80 can determine not to end the image forming operations. When the image forming operations are not ended, the sequence returns to step S903, and the above-described processing is repeated for the sound arising in the next time segment. When the image forming operations are ended, in step S923, the CPU 80 determines whether or not to switch the operation mode to the separately-driving mode. The CPU 80 may always determine to switch the operation mode to the separately-driving mode when the abnormality detection number has reached the upper limit value. Alternatively, the CPU 80 may make a request for the user to approve the switch to the separately-driving mode, and switch the operation mode to the separately-driving mode only when the user has approved the switch. The approval for the switch to the separately-driving mode may be made remotely by a managing user located at a management center. Upon determining to switch the operation mode to the separately-driving mode, in step S930, the CPU 80 switches the operation mode to the separately-driving mode and determines the source of the abnormality. The flow of processing in the separately-driving mode, performed in step S930, will be described further later. If the CPU 80 has determined not to switch the operation mode to the separately-driving mode, or operations in the separately-driving mode end, the abnormality diagnosis processing illustrated in FIG. 9 ends.

Figure 10:
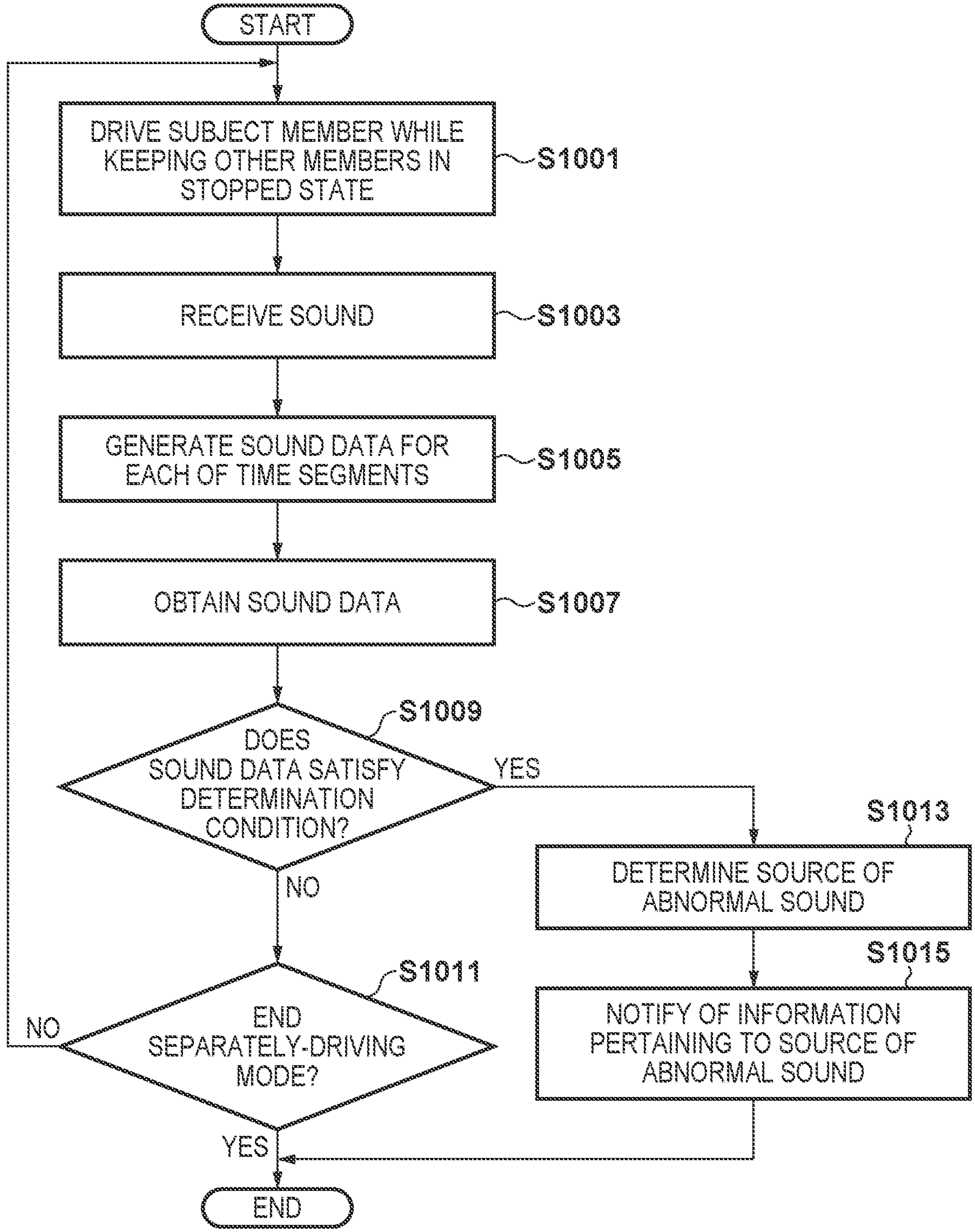
FIG. 10 is a flowchart illustrating, in detail, an example of the flow of source determination processing performed in the separately-driving mode.

FIG. 10 is a flowchart illustrating, in detail, an example of the flow of source determination processing in the separately-driving mode, executed in step S930 of FIG. 9. The source determination processing illustrated in FIG. 10 can be realized by, for example, a combination of hardware such as the sound collecting unit 60 and the signal processing unit 70, and software executed by the CPU 80.

First, in step S1001, the CPU 80 takes at least one of the members identified as a possible source of the abnormal sound as a member to be driven in the separately-driving mode, and drives that member while keeping the other members in a stopped state. At this time, like in step S901, the CPU 80 may set or change the operating parameters, such as the pass band of the digital filter 74 and the length of the time segment used by the average computation unit 76.

Next, in step S1003, the sound collecting unit 60 receives a sound, generates a sound signal, and outputs the generated sound signal to the signal processing unit 70. Next, in step S1005, the signal processing unit 70 executes processing including AD conversion, DC component removal, filtering, squaring, and averaging on the sound signal input from the sound collecting unit 60 to generate sound data expressing the level of the sound for each of time segments. The sound data generated by the signal processing unit 70 is stored in the data storage unit 77.

Next, in step S1007, the CPU 80 obtains, from the data storage unit 77, the sound data from the latest time segment or from the time segments up until that time in the separately-driving mode. Next, in step S1009, the CPU 80 determines whether or not the obtained sound data satisfies a determination condition for determining the source of the abnormal sound. As one example, when one member suspected to have an abnormality is operated, and the signal level L exceeds a first determination threshold throughout a predetermined number of time segments, the CPU 80 may determine that that member is the source of the abnormal sound. As another example, when K-1 members among K members suspected to have an abnormality are operated, and the signal level L drops below a second determination threshold throughout a predetermined number of time segments, the CPU 80 may determine that the other one member suspected to have an abnormality is the source of the abnormal sound. Here, the other one member can be a member kept in the stopped state in step S1001.

When the sound data does not satisfy the above-described determination condition for determining the source of an abnormal sound in step S1009, in step S1011, the CPU 80 determines whether or not to end the separately-driving mode. For example, the CPU 80 may continue operations in the separately-driving mode when sound data has not been generated in a number of time segments sufficient to make a final determination. Additionally, when a plurality of members which are possible sources of the abnormal sound remain, the CPU 80 may continue operating in the separately-driving mode with the subject member changed. The sequence returns to step S1001 when the operations in the separately-driving mode are to be continued. Meanwhile, when the CPU 80 determines to end the separately-driving mode, the source determination processing illustrated in FIG. 10 ends.

When the sound data satisfies the above-described determination condition for determining the source of the abnormal sound in step S1009, in step S1013, the CPU 80 determines the member that is the source of the abnormal sound in accordance with that determination condition. Next, in step S1015, the CPU 80 notifies a local user or a managing user of information pertaining to the determined source of the abnormal sound by displaying the information in a screen of the operation/display unit 83 or transmitting the information to another apparatus through the communication I/F 84. The source determination processing illustrated in FIG. 10 then ends.

Although not illustrated in FIG. 10, if a new print job has been received during operations in the separately-driving mode, the CPU 80 may suspend the operations in the separately-driving mode and execute the new print job preferentially.

4. Variation Example

Although the foregoing mainly described an example in which the image forming apparatus 1 has an abnormality diagnosis function, a diagnosis function for diagnosing a state of the image forming apparatus 1 may be provided in an apparatus different from the image forming apparatus 1. For example, a server apparatus connected to the image forming apparatus 1 over a network may have such a diagnosis function. Alternatively, one of a plurality of image forming apparatuses may have a diagnosis function for diagnosing a state of another of the image forming apparatuses.

Figure 11:
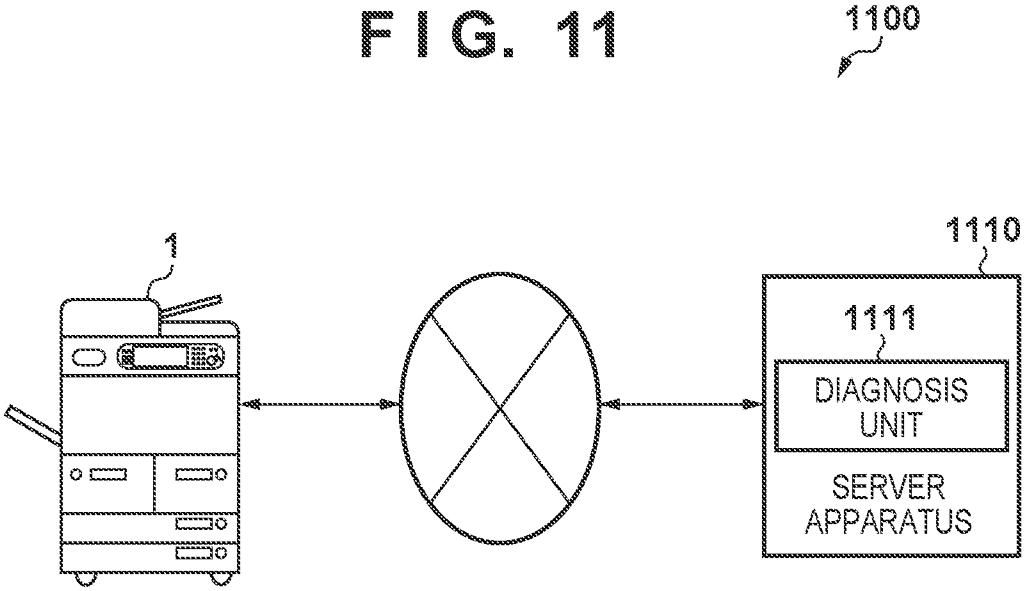
FIG. 11 is a schematic diagram illustrating an example of the overall configuration of an image forming system according to a variation example.

FIG. 11 is a schematic diagram illustrating an example of the overall configuration of an image forming system 1100 according to a variation example. As illustrated in FIG. 11, the image forming system 1100 includes the image forming apparatus 1 and a server apparatus 1110. The CPU 80 of the image forming apparatus 1 transmits sound data based on a sound signal generated by the sound collecting unit 60 (and processed by the signal processing unit 70) to the server apparatus 1110 through the communication I/F 84. A diagnosis unit 1111 of the server apparatus 1110 diagnoses a state of the image forming apparatus 1 on the basis of the sound data received from the image forming apparatus 1 through a communication I/F (not shown). In particular, in the present variation example, when it is determined on the basis of the sound data that an abnormal sound has arisen in the image forming apparatus 1, the diagnosis unit 1111 instructs the CPU 80 of the image forming apparatus 1 to operate in the separately-driving mode. In response to the instruction from the diagnosis unit 1111, the CPU 80 of the image forming apparatus 1 operates one or more members which are possible sources of the abnormal sound separately from the other members. The CPU 80 transmits new sound data, in the separately-driving mode, based on the sound signal generated by the sound collecting unit 60, to the server apparatus 1110 through the communication I/F 84. The diagnosis unit 1111 then determines the source of the abnormal sound on the basis of the sound data in the separately-driving mode, received from the image forming apparatus 1. The diagnosis unit 1111 may narrow down the source of the abnormal sound, determine the source of the abnormal sound, and notify a user of information pertaining to the source of the abnormal sound in the same manner as in the method described above with respect to the abnormality diagnosis function of the image forming apparatus 1.

5. CONCLUSION

Embodiments of the present disclosure have been described in detail thus far with reference to FIGS. 1 to 11. According to the above-described embodiment, when, in the image forming apparatus, it is determined that an abnormal sound has arisen on the basis of a sound signal from a sound collected while operating a plurality of members to form an image in a first operation mode, one or more members that are a possible source of the abnormal sound are identified. Then, the first operation mode is switched to a second operation mode, and in the second operation mode, the source of the abnormal sound is determined by causing at least one of the identified members to operate separately from the other members. According to this configuration, when a plurality of members operate in parallel when forming an image, and the frequency bands of sounds produced by those operations overlap, the member that is the source of the abnormal sound can be identified accurately.

Additionally, according to the above-described embodiment, in the second operation mode, control can be performed such that at least one first member that is a possible source of the abnormal sound operates, and a second member, which operates in parallel with the first member in the first operation mode, does not operate. According to this configuration, sounds from two or more members, which cannot be distinguished simply by analyzing the sound signals in the first operation mode, can be separated in the second operation mode and analyzed individually. This makes it possible to determine the source of the abnormal sound at a detailed level.

As one example, in the second operation mode, driving force is transmitted to the first member by a given driving unit, whereas the transmission of driving force to the second member from the same driving unit can be shut off by controlling a transmission unit. In other words, the source of the abnormal sound can be determined at a detailed level with the ease in the second operation mode by controlling a connection state of the transmission unit in accordance with which member is subject to the determination.

As another example, in the second operation mode, control can be performed so that a second driving unit that generates driving force for the second member is stopped, whereas a first driving unit that generates driving force for the first member operates. In other words, the source of the abnormal sound can be determined at a detail level with the ease in the second operation mode by controlling driving states of the driving units in accordance with which member is subject to the determination.

Additionally, according to the above-described embodiment, whether or not the abnormal sound has arisen can be determined by generating sound data expressing a level of the sound collected when forming an image in the first operation mode, and comparing the sound data with a threshold. Accordingly, an abnormal sound, which is greater than a normal operation sound arising when the normal execution of the job is underway, can be detected, and it can then be determined whether the operation mode should be switched to the second operation mode. Signal processing for generating the sound data may include extracting, from a sound signal, a frequency component of a pass band set in a variable manner, and the pass band may be set in a variable manner in accordance with which member is subject to the abnormality diagnosis. In this case, candidates for the source member of the abnormal sound can be narrowed down as necessary to effectively advance the abnormality diagnosis.

Additionally, according to the above-described embodiment, the operations in the second operation mode can be performed following the execution of a normal job in the first operation mode. In this case, a situation in which the user is bothered by the sudden occurrence of an abnormality diagnosis can be avoided, and downtime of the apparatus can also be kept to a minimum.

6. OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. by reference herein in its entirety.

What is claimed is:

1. An image forming apparatus comprising:

an image forming unit that includes a plurality of members;

a control unit configured to control operations of the plurality of members; and a microphone configured to collect sound that arises in the image forming apparatus to generate sound signals, wherein the control unit is configured to, in a first operation mode, obtain a first sound signal generated by the microphone while controlling the operations of the plurality of members such that the image forming unit forms an image on a recording material, determine, based on the first sound signal, that an abnormal sound has arisen, and identify, based on driving states of the plurality of members during a period in which the abnormal sound is determined to have arisen, one or more members of the plurality of members that are possible sources of the abnormal sound, and wherein the control unit is configured to, upon identifying the one or more members and in a case where the identified one or more members include a first member and a second member, in a second operation mode, control the operations of the first and second members such that one of the first and second members is caused to operate while the other of the first and second members is caused not to operate whereby determining a source of the abnormal sound based on a second sound signal generated by the microphone in the second operation mode.

2. The image forming apparatus according to claim 1, wherein, in the first operation mode, the second member is configured to operate in parallel with the first member, and wherein, in the second operation mode, the control unit is configured to cause the first member to operate without causing the second member to operate.

3. The image forming apparatus according to claim 2, wherein the image forming unit further includes:

a motor configured to generate a driving force for causing the first member and the second member to operate, and a transmission configured to transmit the driving force from the motor to the second member or to shut off the transmission of the driving force from the motor to the second member, and wherein, in the second operation mode, the control unit is configured to cause the first member to operate while controlling the transmission to shut off the transmission of the driving force to the second member.

4. The image forming apparatus according to claim 2, wherein the image forming unit further includes:

a first motor configured to generate a driving force for causing the first member to operate, and a second motor configured to generate a driving force for causing the second member to operate, and wherein, in the second operation mode, the control unit is configured to cause the second motor to stop, and to cause the first motor to generate the driving force for causing the first member to operate.

5. The image forming apparatus according to claim 1, further comprising a signal processing unit configured to execute processing on a sound signal generated by the microphone to generate sound data expressing a level of the sound that arises in the image forming apparatus, wherein the control unit is configured to determine whether or not the abnormal sound has arisen by comparing the sound data with a threshold.

6. The image forming apparatus according to claim 5, wherein the processing executed by the signal processing unit on the generated sound signal includes extracting, from the sound signal, a frequency component in a pass band set in a first variable manner, and wherein the control unit is configured to set the pass band in the signal processing unit in a second variable manner in accordance with which of the plurality of members is to be subjected to an abnormality diagnosis.

7. The image forming apparatus according to claim 1, wherein the control unit is configured to cause the image forming unit to operate in the second operation mode following execution of a job in the first operation mode.

8. The image forming apparatus according to claim 1, wherein the control unit is configured to make a request for approval for a switch to the second operation mode to a user through a user interface, and to switch an operation mode to the second operation mode when approval for the operation mode switch is received from the user.

9. The image forming apparatus according to claim 1, further comprising a display configured to display information pertaining to the source of the abnormal sound determined by the control unit.

10. The image forming apparatus according to claim 1, further comprising a communication interface configured to transmit, to another apparatus, information pertaining to the source of the abnormal sound determined by the control unit.

11. An image forming system comprising:

an image forming apparatus; and a server apparatus, wherein the image forming apparatus includes:

an image forming unit that includes a plurality of members, a first communication interface, a microphone configured to collect sound that arises in the image forming apparatus to generate sound signals, and a control unit configured to control operations of the plurality of members in a first operation mode in which the image forming unit forms an image on a recording material, and transmit, to the server apparatus, first data based on a first sound signal generated by the microphone while the plurality of members operate in the first operation mode, and wherein the server apparatus includes:

a second communication interface, and one or more processors configured to receive the first data from the image forming apparatus, determine, based on the first data, that an abnormal sound has arisen, identify, based on driving states of the plurality of members during a period in which the abnormal sound is determined to have arisen, one or more members of the plurality of members that are possible sources of the abnormal sound, instruct, upon identifying the one or more members and in a case where the identified one or more members include a first member and a second member, the control unit of the image forming apparatus to control, in a second operation mode, the operations of the first and second members such that one of the first and second members is caused to operate while the other of the first and second members is caused not to operate, receive, from the image forming apparatus, second data based on a second sound signal generated by the microphone in the second operation mode, and determine a source of the abnormal sound based on the second data.

12. A server apparatus connected to an image forming apparatus, wherein the image forming apparatus includes:

an image forming unit that includes a plurality of members, a microphone configured to collect sound that arises in the image forming apparatus to generate sound signals, and a control unit configured to control operations of the plurality of members in a first operation mode in which the image forming unit forms an image on a recording material, and transmit, to the server apparatus, first data based on a first sound signal generated by the microphone while the plurality of members operate in the first operation mode, the server apparatus comprising:

a communication interface; and one or more processors configured to receive the first data from the image forming apparatus, determine, based on the first data, that an abnormal sound has arisen, identify, based on driving states of the plurality of members during a period in which the abnormal sound is determined to have arisen, one or more members of the plurality of members that are possible sources of the abnormal sound, instruct, upon identifying the one or more members and in a case where the identified one or more members include a first member and a second member, the control unit of the image forming apparatus to control, in a second operation mode, the operations of the first and second members such that one of the first and second members is caused to operate while the other of the first and second members is caused not to operate, receive, from the image forming apparatus, second data based on a second sound signal generated by the microphone in the second operation mode, and determine a source of the abnormal sound based on the second data.

* * * * *